(12) United States Patent
Patra

(10) Patent No.: US 10,229,240 B2
(45) Date of Patent: Mar. 12, 2019

(54) ELECTROMIGRATION CHECK IN LAYOUT DESIGN USING COMPILED RULES LIBRARY

(71) Applicant: Mentor Graphics Corporation, Wilsonville, OR (US)

(72) Inventor: Kaushik Patra, San Ramon, CA (US)

(73) Assignee: Mentor Graphics Corporation, Wilsonville, OR (US)

( * ) Notice: Subject to any disclaimer, the term of this patent is extended or adjusted under 35 U.S.C. 154(b) by 80 days.

(21) Appl. No.: 15/411,839

(22) Filed: Jan. 20, 2017

(65) Prior Publication Data

US 2018/0210995 A1 Jul. 26, 2018

(51) Int. Cl.
*G06F 17/50* (2006.01)

(52) U.S. Cl.
CPC ...... *G06F 17/5081* (2013.01); *G06F 2217/06* (2013.01)

(58) Field of Classification Search
USPC .......................................... 716/112
See application file for complete search history.

(56) References Cited

U.S. PATENT DOCUMENTS

| | | | | |
|---|---|---|---|---|
| 5,581,475 A | * | 12/1996 | Majors | G06F 17/5081 716/112 |
| 6,584,606 B1 | * | 6/2003 | Chiu | G06F 17/5036 716/112 |
| 2007/0245285 A1 | * | 10/2007 | Wang | G06F 17/505 716/104 |
| 2013/0305194 A1 | * | 11/2013 | Wang | G06F 17/5081 716/52 |

* cited by examiner

*Primary Examiner* — Bryce M Aisaka
(74) *Attorney, Agent, or Firm* — Mentor Graphics Corporation

(57) ABSTRACT

This application discloses a computing system to receive electromigration design rules defining characteristics of integrated circuits configured to cause electromigration, generate a rules library including machine code implementing electromigration design rule checks for the characteristics defined by the electromigration design rules, and perform the electromigration design rule checks on a layout design of an integrated circuit by executing the machine code implementing the electromigration design rule checks on structures of the integrated circuit described in the layout design. The computing system can generate the rules library at runtime by parsing the electromigration design rules to identify the characteristics of integrated circuits configured to cause electromigration, translating the electromigration design rules into an intermediate format based on the identified characteristics of integrated circuits, expanding macro instructions in the intermediate file into the source code, and compiling the source code into machine code for population into the rules library.

14 Claims, 5 Drawing Sheets

ELECTROMIGRATION CHECK IN LAYOUT DESIGN USING COMPILED RULES LIBRARY

TECHNICAL FIELD

This application is generally related to electronic design automation and, more specifically, to an electromigration check in circuit design using compiled rules library.

BACKGROUND

Electromigration (EM) is a phenomenon causing material transport in a conductor through a gradual movement or drift of ions, for example, due to momentum transfer between electrons in the conductor and diffusing metal atoms in an interconnect. In the semiconductor field, this electromigration phenomenon often appears in integrated circuits when high current densities are present on a conductive structure. The gradual movement of ions in these integrated circuits can cause electrical problems, such as integrated circuit failure due to open circuits and/or short circuits.

Semiconductor manufacturers or foundries can identify design rules based on the electromigration phenomenon, which can provide limitations on wires or other conductive structures in the integrated circuits based on current densities associated with those structures. These design rules may be specified in a variety of different file formats, such as Interconnect Technology Format (ITF), Unified Interconnect Modeling Format (iRCX), Portable Document Format (PDF) documents, or the like, each of which can express electromigration design rules for limit computation specific to the semiconductor manufacturer.

Designers of integrated circuits can utilize one or more design rule checking tools to analyze a layout design of an integrated circuit for violations of the electromigration design rules. The layout design may describe the integrated circuit in a GDSII file format, an Open Artwork System Interchange Standard (OASIS) format, Library Exchange Format (LEF), Design Exchange Format (DEF), or the like. The design rule checking tools can parse the electromigration design rules from the design rule files generated by the semiconductor manufacturer and generate in-memory models of the electromigration design rules, for example, generating condition trees and/or expression trees for the electromigration design rules, which the design rule checking tools load into memory for utilization during the design rule check operations.

During an electromigration check, the design rule checking tools can execute an electromigration check program to identify portions of the layout design for the integrated circuit having conductive structures and to evaluate the identified portions of the layout design against the electromigration design rules. Specifically, the design rule checking tools implementing the electromigration check program traverse the condition trees and/or expression trees to generate input data to the electromigration check program for use in the evaluation of whether physical configuration and/or electrical characteristics of the conductive structures conform to the electromigration design rules. While this technique can identify whether the layout design conforms to the electromigration design rules, the generation of in-memory condition trees and/or expression trees consumes memory resources, and the utilization of the in-memory condition trees and/or expression trees to generate input to the electromigration check program slows evaluation of the layout design for conformance to the electromigration design rules by the design rule checking tools.

SUMMARY

This application discloses a computing system to receive electromigration design rules defining characteristics of integrated circuits configured to cause electromigration, generate a rules library including machine code implementing electromigration design rule checks for the characteristics defined by the electromigration design rules, and perform the electromigration design rule checks on a layout design of an integrated circuit by executing the machine code implementing the electromigration design rule checks on structures of the integrated circuit described in the layout design. The computing system can generate the rules library at runtime by parsing the electromigration design rules to identify the characteristics of integrated circuits configured to cause electromigration, translating the electromigration design rules into an intermediate format based on the identified characteristics of integrated circuits, expanding macro instructions in the intermediate file into the source code, and compiling the source code into machine code for population into the rules library. Embodiments will be described below in greater detail.

DETAILED DESCRIPTION

Illustrative Operating Environment

Figure 1:
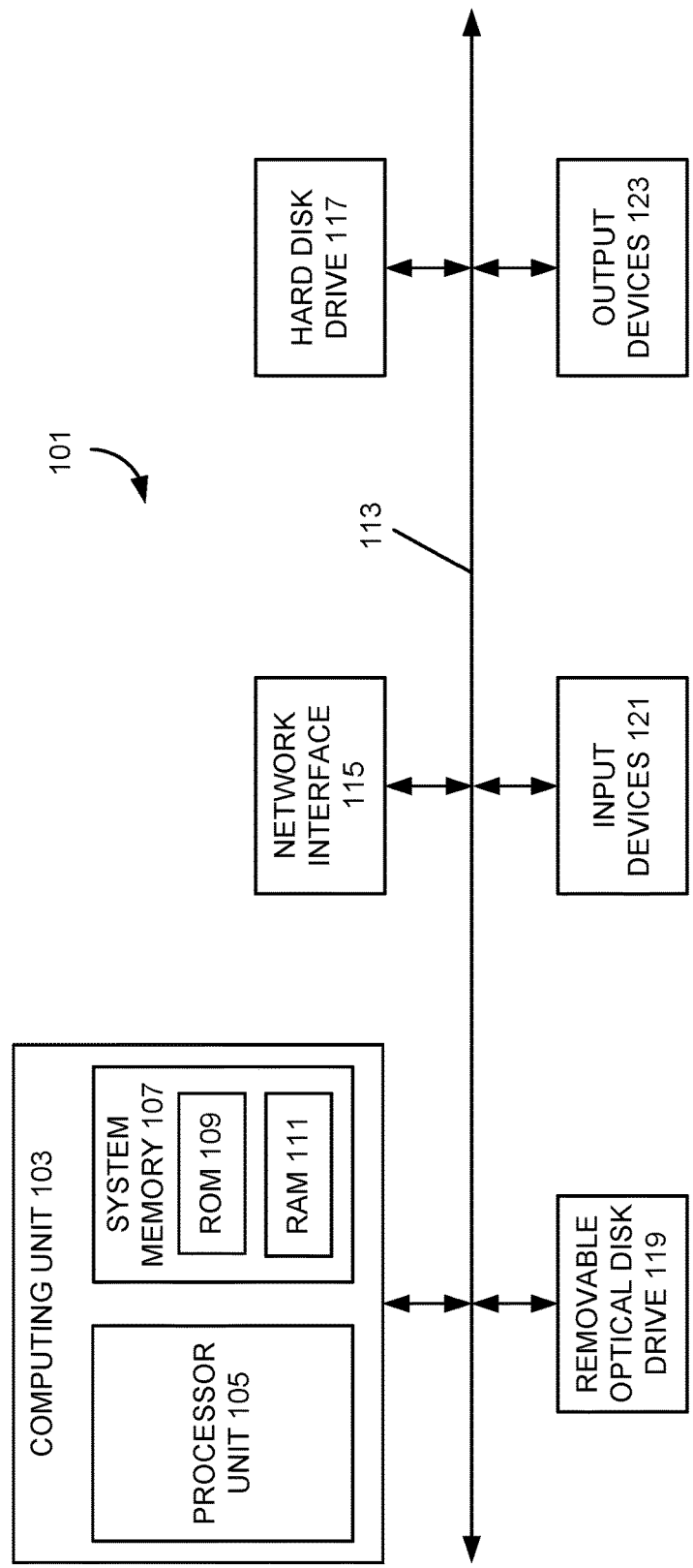
FIGS. 1 and 2 illustrate an example of a computer system of the type that may be used to implement various embodiments.

Various examples of the invention may be implemented through the execution of software instructions by a computing device 101, such as a programmable computer. Accordingly, FIG. 1 shows an illustrative example of a computing device 101. As seen in this figure, the computing device 101 includes a computing unit 103 with a processing unit 105 and a system memory 107. The processing unit 105 may be any type of programmable electronic device for executing software instructions, but will conventionally be a microprocessor. The system memory 107 may include both a read-only memory (ROM) 109 and a random access memory (RAM) 111. As will be appreciated by those of ordinary skill in the art, both the read-only memory (ROM) 109 and the random access memory (RAM) 111 may store software instructions for execution by the processing unit 105.

The processing unit 105 and the system memory 107 are connected, either directly or indirectly, through a bus 113 or alternate communication structure, to one or more peripheral devices 117-123. For example, the processing unit 105 or the system memory 107 may be directly or indirectly connected to one or more additional memory storage devices, such as a hard disk drive 117, which can be magnetic and/or removable, a removable optical disk drive 119, and/or a flash memory card. The processing unit 105 and the system memory 107 also may be directly or indirectly connected to one or more input devices 121 and one or more output devices 123. The input devices 121 may include, for example, a keyboard, a pointing device (such as a mouse, touchpad, stylus, trackball, or joystick), a scanner, a camera, and a microphone. The output devices 123 may include, for example, a monitor display, a printer and speakers. With various examples of the computing device 101, one or more of the peripheral devices 117-123 may be internally housed with the computing unit 103. Alternately, one or more of the peripheral devices 117-123 may be external to the housing for the computing unit 103 and connected to the bus 113 through, for example, a Universal Serial Bus (USB) connection.

With some implementations, the computing unit 103 may be directly or indirectly connected to a network interface 115 for communicating with other devices making up a network. The network interface 115 can translate data and control signals from the computing unit 103 into network messages according to one or more communication protocols, such as the transmission control protocol (TCP) and the Internet protocol (IP). Also, the network interface 115 may employ any suitable connection agent (or combination of agents) for connecting to a network, including, for example, a wireless transceiver, a modem, or an Ethernet connection. Such network interfaces and protocols are well known in the art, and thus will not be discussed here in more detail.

It should be appreciated that the computing device 101 is illustrated as an example only, and it not intended to be limiting. Various embodiments of the invention may be implemented using one or more computing devices that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

Figure 2:
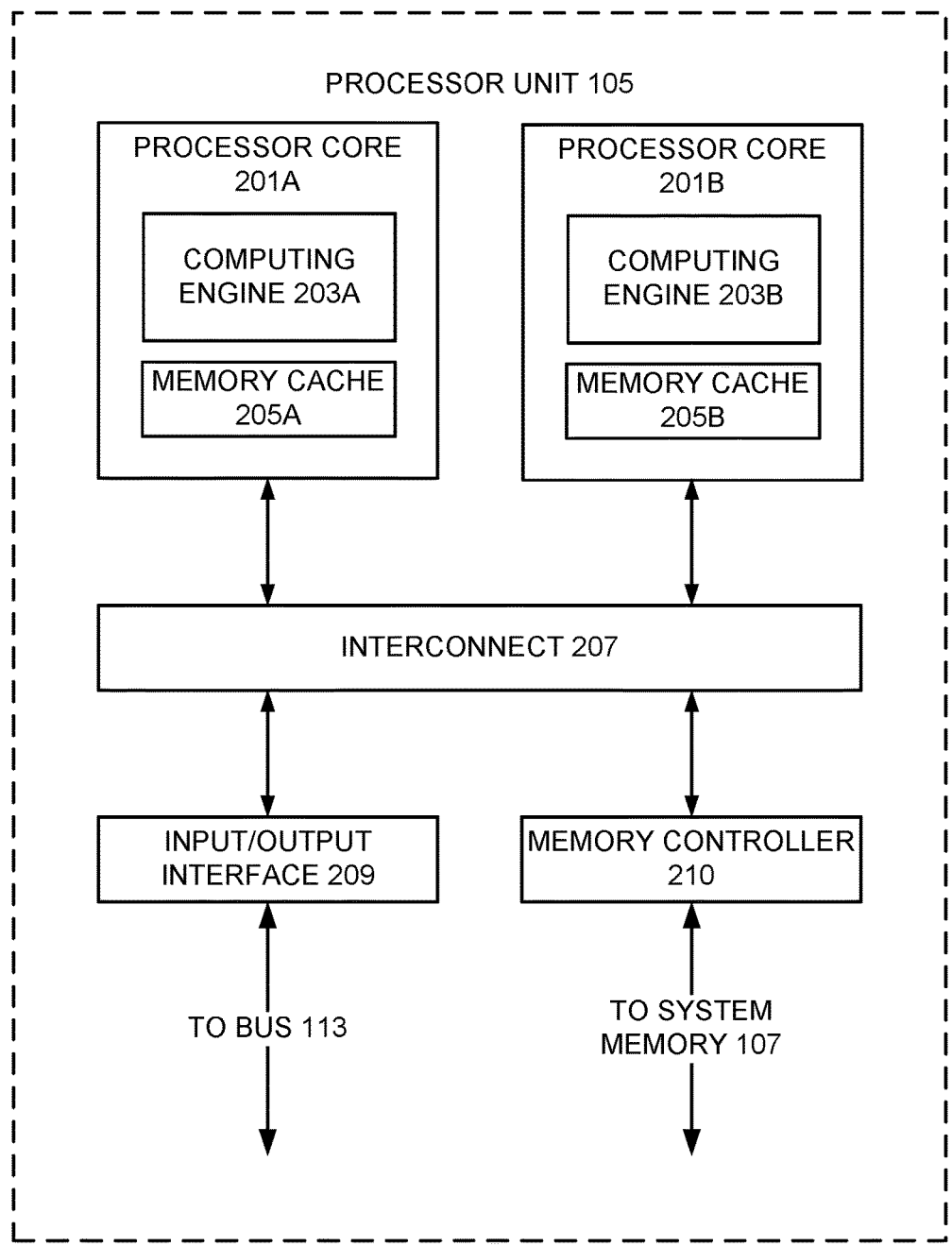

With some implementations of the invention, the processor unit 105 can have more than one processor core. Accordingly, FIG. 2 illustrates an example of a multi-core processor unit 105 that may be employed with various embodiments of the invention. As seen in this figure, the processor unit 105 includes a plurality of processor cores 201A and 201B. Each processor core 201A and 201B includes a computing engine 203A and 203B, respectively, and a memory cache 205A and 205B, respectively. As known to those of ordinary skill in the art, a computing engine 203A and 203B can include logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203A and 203B may then use its corresponding memory cache 205A and 205B, respectively, to quickly store and retrieve data and/or instructions for execution.

Each processor core 201A and 201B is connected to an interconnect 207. The particular construction of the interconnect 207 may vary depending upon the architecture of the processor unit 105. With some processor cores 201A and 201B, such as the Cell microprocessor created by Sony Corporation, Toshiba Corporation and IBM Corporation, the interconnect 207 may be implemented as an interconnect bus. With other processor units 201A and 201B, however, such as the Opteron™ and Athlon™ dual-core processors available from Advanced Micro Devices of Sunnyvale, Calif., the interconnect 207 may be implemented as a system request interface device. In any case, the processor cores 201A and 201B communicate through the interconnect 207 with an input/output interface 209 and a memory controller 210. The input/output interface 209 provides a communication interface to the bus 113. Similarly, the memory controller 210 controls the exchange of information to the system memory 107. With some implementations of the invention, the processor unit 105 may include additional components, such as a high-level cache memory accessible shared by the processor cores 201A and 201B. It also should be appreciated that the description of the computer network illustrated in FIG. 1 and FIG. 2 is provided as an example only, and it not intended to suggest any limitation as to the scope of use or functionality of alternate embodiments.

Electromigration Check in Layout Design Using Compiled Rules Library

Figure 3:
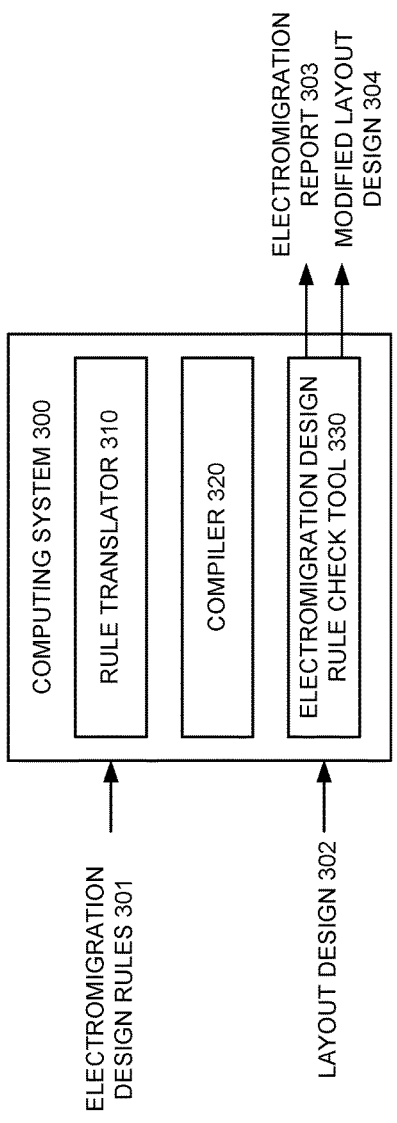
FIG. 3 illustrates an example of a design rule check tool to perform electromigration rule checks using a rules library according to various embodiments.

FIG. 3 illustrates an example of a computing system 300 to perform electromigration design rule checks using a rules library according to various embodiments. Referring to FIG. 3, the computing system 300 can be similar to the computing device 101 described above in FIGS. 1 and 2, and can execute one or more sets of machine-executable instructions to implement rules translation, compilation, and/or electromigration design rule checks, among other operations. The computing system 300 can receive electromigration design rules 301 defining characteristics of integrated circuits configured to cause electromigration.

The semiconductor manufacturers or foundries, based on their specific manufacturing or fabrication capabilities, can identify limitations on physical and/or electrical characteristics of structures in the integrated circuits that can cause electromigration of ions in the structures and result in open or short circuits. For example, the semiconductor manufacturers or foundries can determine certain width and length ratios or sizes that may allow current densities high enough to induce the electromigration of ions in the structures. The semiconductor manufacturers or foundries can utilize the limitations to define the electromigration design rules 301, which may be specified in a variety of different file formats, such as Interconnect Technology Format (ITF), Unified Interconnect Modeling Format (iRCX), Portable Document Format (PDF) documents, or the like. Each of the different formats may express electromigration design rules 301 for limitation computation specific to the semiconductor manufacturer or foundry.

The computing system 300 can receive a layout design 302 of an integrated circuit, which can describe the integrated circuit in terms of planar geometric shapes corresponding to patterns of metal, oxide, or semiconductor layers that make up components of the integrated circuit. The layout design 302 can describe the integrated circuit in a GDSII file format, an Open Artwork System Interchange Standard (OASIS) format, Library Exchange Format (LEF), Design Exchange Format (DEF), or the like.

The computing system 300 can execute machine-executable instructions to implement a rule translator 310, which can utilize the electromigration design rules 301 to generate one or more electromigration rule checks. The electromigration rule checks can include one or more conditions or expressions that check characteristics of structures in the integrated circuit against the limitations in the electromigration design rules 301. In some embodiments, the rule translator 310 can parse the electromigration design rules 301 based on their received format to identify the limitations on characteristics of the structures in the integrated circuit. The rule translator 310 can build the electromigration rule checks with conditions and/or expressions capable of being evaluated based on the identified the limitations on characteristics of the structures in the integrated circuit. For example, when the electromigration design rules 301 define a limitation on a size of a structure in an integrated circuit, such as a limitation on a length of the structure and/or a width of the structure, the rule translator 310 can identify the presence of the limitation in the electromigration design rules 301 and generate at least conditional statement based on the limitation. The rule translator 310 also can build expression statements, for example, to be evaluated when a condition statement in the electromigration design rules 301 has been satisfied.

The rule translator 310 may generate or build the electromigration rule checks, such as the expression statements and/or conditional statements, in a variety of different formats. In some embodiments, the rule translator 310 may generate the electromigration rule checks into a compilable format, for example, as source code in a computer language, such as C++ or the like. The compilable format may be input into a compiler 320 for conversion into a machine-readable format for execution by one or more processing devices in the computing system 300.

In some embodiments, the rule translator 310 may generate the electromigration rule checks as an intermediate format, for example, utilizing macro instructions and associated parameters to build the expression statements and/or conditional statements. As will be described below in greater detail, the computing system 300 may convert the intermediate format into a compilable format, for example, by expanding the macro instructions and associated parameters into sets of source code instructions capable of being subsequently compiled. Although FIG. 3 shows the computing system 300 implementing the rules translator 310, in some embodiments, the computing system 300 can receive the electromigration rule checks in a compilable format or an intermediate format from an external source to the computing system 300.

The computing system 300 can execute machine-executable instructions to implement the compiler 320, which can receive the electromigration rule checks from the rules translator 310 or from a source external to the computing system 300. The electromigration rule checks can be in one or more different formats, such as a compilable format or an intermediate format. When the electromigration rule checks are configured in a compilable format, for example, written in a compilable computer language, such as C++ or the like, the compiler 320 can convert the electromigration rule checks into machine code. The machine code generated by the compiler 320 can be combined into a rules library, which can accompany other compiled machine code instructions to form a machine-executable computer program executable by the computing system 300.

When the electromigration rule checks are configured in an intermediate format, the compiler 320 can expand the macro instructions present in the electromigration rule checks to generate electromigration rule checks in the compilable format. In some embodiments, the compiler 320 can identify and expand the macro instructions based, at least in part, on a header (.h) file, which can identify macro instructions and how to expand the macro instructions and corresponding parameters in the intermediate format into source code in the compilable format. In some embodiments, the compiler 320 may receive the header file from other portions of the computing system 300 or from a source external to the computing system 300. Once in the compilable format, the compiler 320 can convert the electromigration rule checks into machine code for utilization in the rules library.

In some embodiments, the compiler 320 may be a just-in-time (JIT) compiler, which can perform compilation of the electromigration rule checks and possibly the macro instruction expansion of the intermediate format during runtime of the computing system 300. For example, when the computing system 300 executes at least one instruction in a design rule check program, which prompts performance of electromigration design rule checks, the computing system 300 can invoke the just-in-time (JIT) compiler to dynamically generate the rules library of machine code from the electromigration rule checks. The rules library of machine code, when executed, can cause an electromigration design rule check tool 330 implemented by the computing system 300 to perform one or more electromigration rule checks. In some embodiments, the rules library can be a dynamically linkable library or shared library available to the computing system 300.

The electromigration design rule check tool 330 can perform the electromigration rule checks by executing a design rule check program to identify one or more structures in the layout design 302 having characteristics comparable against the electromigration design rules 301. The electromigration design rule check tool 330 can dynamically extend the design rule check program at runtime by calling the rules library having machine code that, when executed, can perform the electromigration rule checks on the identified structures in the layout design 302. In some embodiments, the electromigration design rule check tool 330 can prompt the compiler 320 to generate the rules library, at runtime, for utilization in the performance the electromigration rule checks. The electromigration design rule check tool 330 can execute the machine code in the rules library, which performs the electromigration rule checks on the identified structures in the layout design 302.

The electromigration design rule check tool 330 can generate an electromigration report 303 including an identification of one or more structures in the layout design 302 that the electromigration design rule check tool 330 checked against the electromigration design rules 301 and an identification of the outcome of the checks of those structures against the electromigration design rules 301. For example, the electromigration report 303 can identify structures on the layout design 301 having characteristics that violate one or more of the electromigration design rules 301, identify which of the electromigration design rules 301 was violated by the characteristics of the structures, identify which characteristic(s) of the structures were in violation, provide a suggested alteration to the structure that would alleviate the violation of the electromigration design rules 301, or the like. In some embodiments, the electromigration design rule check tool 330 can modify the structure in the layout design 302 based on the suggested alteration, and output a modified layout design 304 having the modified structure. The electromigration report 303 also can identify which portions of the layout design 302 were modified in the generation of the modified layout design 304.

Figure 4:
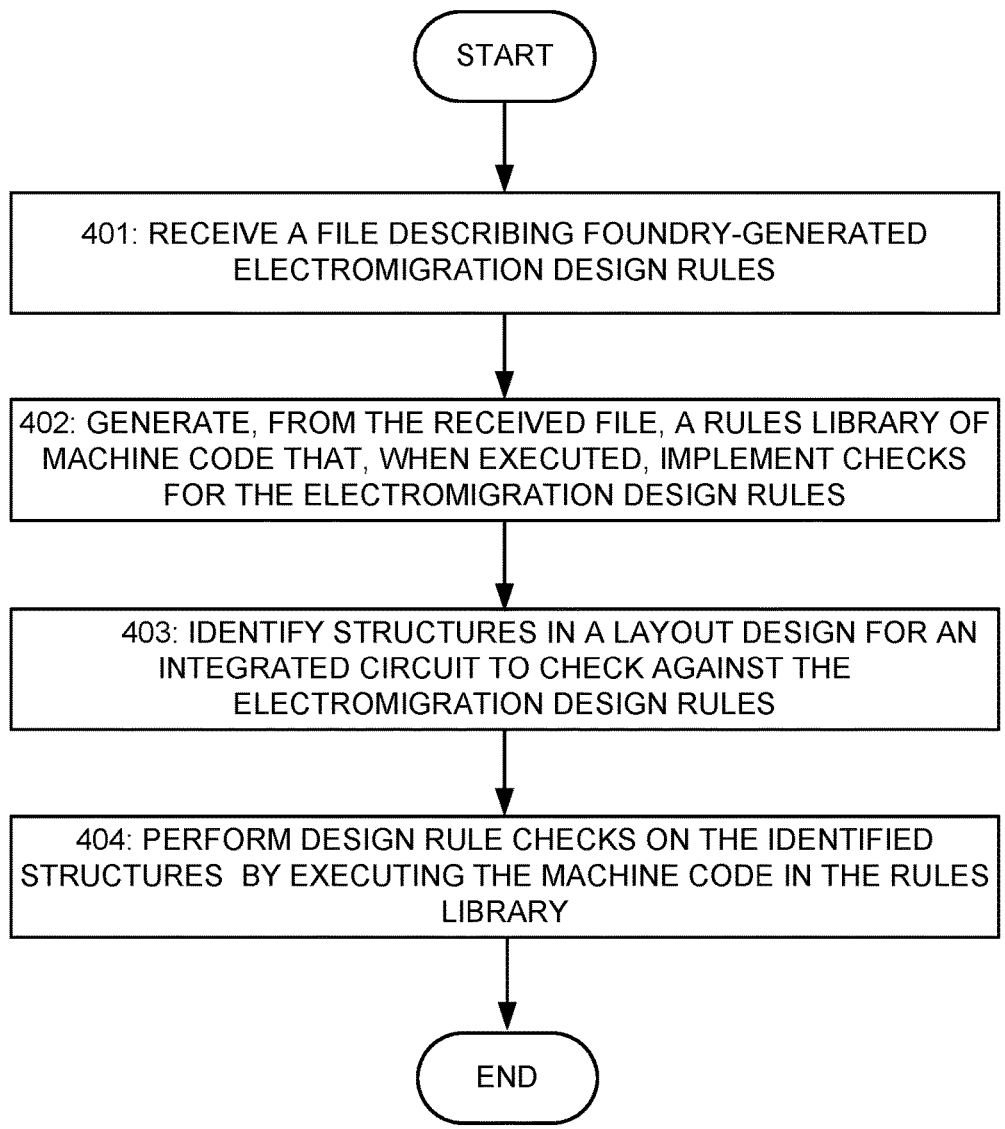
FIG. 4 illustrates an example flowchart for performing an electromigration rule check utilizing a dynamically executable library according to various embodiments.

FIG. 4 illustrates an example flowchart for performing an electromigration rule check utilizing a dynamically executable library according to various embodiments. Referring to FIG. 4, in a block 401, a computing system can receive a file describing foundry-generated electromigration design rules. The electromigration design rules can define characteristics of integrated circuits configured to cause electromigration. In some embodiments, the electromigration design rules can describe limitations on physical or electrical characteristics of structures in the integrated circuits. The electromigration design rules may be specified in a variety of different file formats, such as Interconnect Technology Format (ITF), Unified Interconnect Modeling Format (iRCX), Portable Document Format (PDF) documents, or the like, each of which can express electromigration design rules for limitation computation specific to the semiconductor manufacturer or foundry.

In a block 402, the computing system can generate, from the received file, a rules library of machine code that, when executed, implement checks for the electromigration design rules. The computing system can translate the electromigration design rules into source code for electromigration design rule checks, for example, written in a compilable computer language, such as C++ or the like, and then compile the source code into the machine code included in the rules library. The translation of the electromigration design rules into the source code may be a multiple step procedure, which translates the electromigration design rules into an intermediate format, for example, including macro instructions and associated parameters, before converting the intermediate format into the compilable source code. In some embodiments, the computing system can convert the intermediate format by expanding the macro instructions based on a header file identifying the macro instructions and corresponding expansion into lines of source code.

In some embodiments, the computing system can generate the rules library of machine code at runtime of another computer program being executed by the computing system, for example, allowing execution of the machine code in the rules library to extend the computer program executed by the computing system. Although FIG. 4 shows the generation of the rules library from the electromigration design rules themselves, in some embodiments, the computing system can receive the intermediate format or the compilable source code and generate the rules library from those received formats.

In a block 403, the computing system can identify structures in a layout design for an integrated circuit to check against the electromigration design rules, and in a block 404, the computing system can perform design rule checks on the identified structures by executing machine code in the rules library. The computing system can perform the electromigration rule checks by executing a design rule check program to identify one or more structures in the layout design having characteristics comparable against the electromigration design rules. The computing system can dynamically extend the design rule check program at runtime by calling the rules library having machine code that, when executed, can perform the electromigration rule checks on the identified structures in the layout design. In some embodiments, the computing system can utilize a just-in-time compiler to generate the rules library, at runtime, for utilization in the performance the electromigration rule checks. The computing system can execute the machine code in the rules library, which performs the electromigration rule checks on the identified structures in the layout design.

Figure 5:
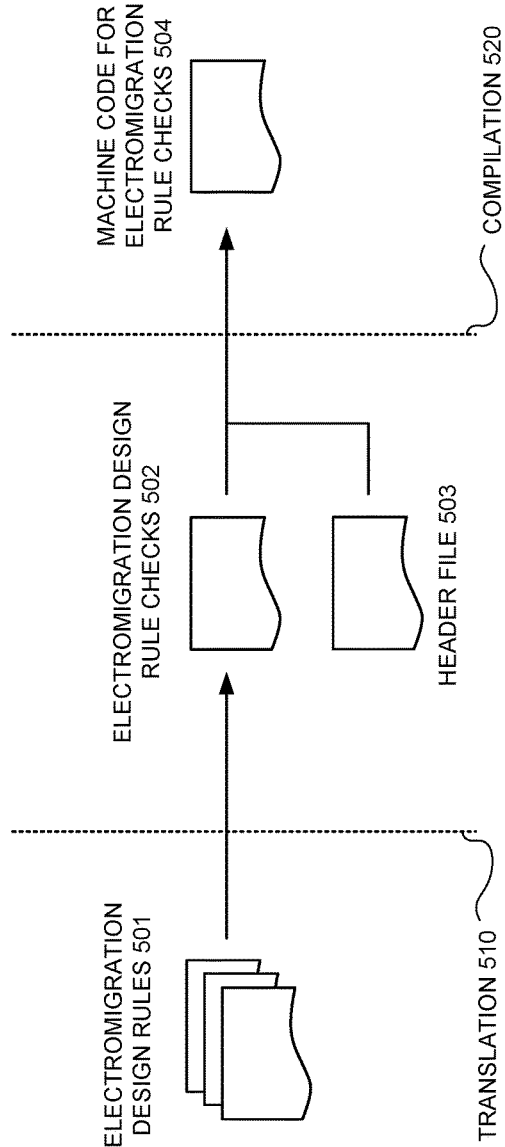
FIG. 5 illustrates an example flow for generation of a rules library having machine code for electromigration design rule checks from electromigration design rules according to various embodiments.

FIG. 5 illustrates an example flow for generation of a rules library having machine code for electromigration design rule checks 504 from electromigration design rules 501 according to various embodiments. Referring to FIG. 5, the electromigration design rules 501 can define characteristics of integrated circuits configured to cause electromigration. In some embodiments, the electromigration design rules 501 can describe limitations on physical or electrical characteristics of structures in the integrated circuits. The electromigration design rules 501 may be specified in a variety of different file formats, such as Interconnect Technology Format (ITF), Unified Interconnect Modeling Format (iRCX), Portable Document Format (PDF) documents, or the like, each of which can express electromigration design rules 501 for limitation computation specific to the semiconductor manufacturer or foundry.

The flow can include a translation 510 from the electromigration design rules 501 into electromigration design rule checks 502. The electromigration design rule checks 502, in some embodiments, can define procedures to evaluate structure limitations described in the electromigration design rules 501. The translation 510 can parse the electromigration design rules 501 to identify the structure limitations, such as width, length, or combination thereof limitations, and also identify limitations on current or current densities in the structures as well as one or more expressions on how to compute the current or current densities from the characteristics of the structures. The translation 510 can utilize the identified structure limitations and electrical limitations to generate at least one conditional statement, expression statement, or like.

In an example, when the electromigration design rules 501 describe limitations on structures in an integrated circuit by stating structures with a length (L) of less than 0.5 and a width (W) greater than 0.5 should not have a current (EM_CUR) in excess of Z. The limitations also can identify how to compute the current (EM_CUR), for example, as 1.25 multiplied by the length (L) added to 2.6 multiplied by the width (W).

The translation 510 in the flow can utilize these limitations to build a condition statement and an expression statement in an intermediate format. Examples of a condition statement and an expression statement in the intermediate format implementing these limitations are shown below:

$$\text{COND}:=(L<0.5) \text{ AND } (W>0.5)$$

$$\text{POLYNOMIAL}:=(1.25*L)+(2.6*W).$$

The flow can include a compilation 520 from the electromigration design rule checks 502 into machine code for the electromigration design rule checks 504. The compilation 520 can receive the electromigration design rule checks 502 as well as a header file 503, which can identify macro instructions in the electromigration design rule checks 502 and how to expand the macro instructions into a source code format.

The compilation 520 can perform the macro instruction expansion of the electromigration design rule checks 502 based on the header file 503. Continuing the example above, the C++ source code of the electromigration design rule checks generated by the macro instruction expansion can be implemented as:

If $((L<0.5)$ && $(W>0.5))$ $EM\_CUR=(1.25*L)+(2.6*W);$

In some examples, the COND and AND portions of the condition statement can correspond to macro instructions. The COND macro instruction can be expanded into source code to implement the condition (L<0.5) AND (W>0.5). The AND macro instruction can be expanded to implement source code for a Boolean AND operator (&&). The POLYNOMIAL portion of the expression statement can correspond to macro instruction, which can be expanded to evaluate the expression (1.25*L)+(2.6*W) when the condition statement has been satisfied.

Since the source code of the electromigration design rule checks generated by the macro instruction expansion is in a compilable format, the compilation 520 can compile the generate source code in the compilable format into the machine code for the electromigration design rule checks 504. Continuing the example above, the machine code for the electromigration design rule checks 504 can be implemented as:

$t1=value of L;
$t2=value of W;
$t3=(L<0.5)
$t4=(W>0.5)
$t3=$t3 & $t4
if $t3 is true go to EVAL;
. . .
EVAL:
$t3=1.25*$t1;
$t4=2.6*$t2;
$t5=$t3+$t4;
EM_CUR=$t5;

Since the machine code is specific to the hardware to execute the instructions, the compilation 520 may utilize the same source code in the compilable format to generate machine code in different formats based on the hardware to execute the machine code. The compilation 520 may combine the machine code for the electromigration design rule checks 504 into a shared rules library for utilization by a computing system to perform electromigration design rule checks on a layout design for an integrated circuit.

Figure 6:
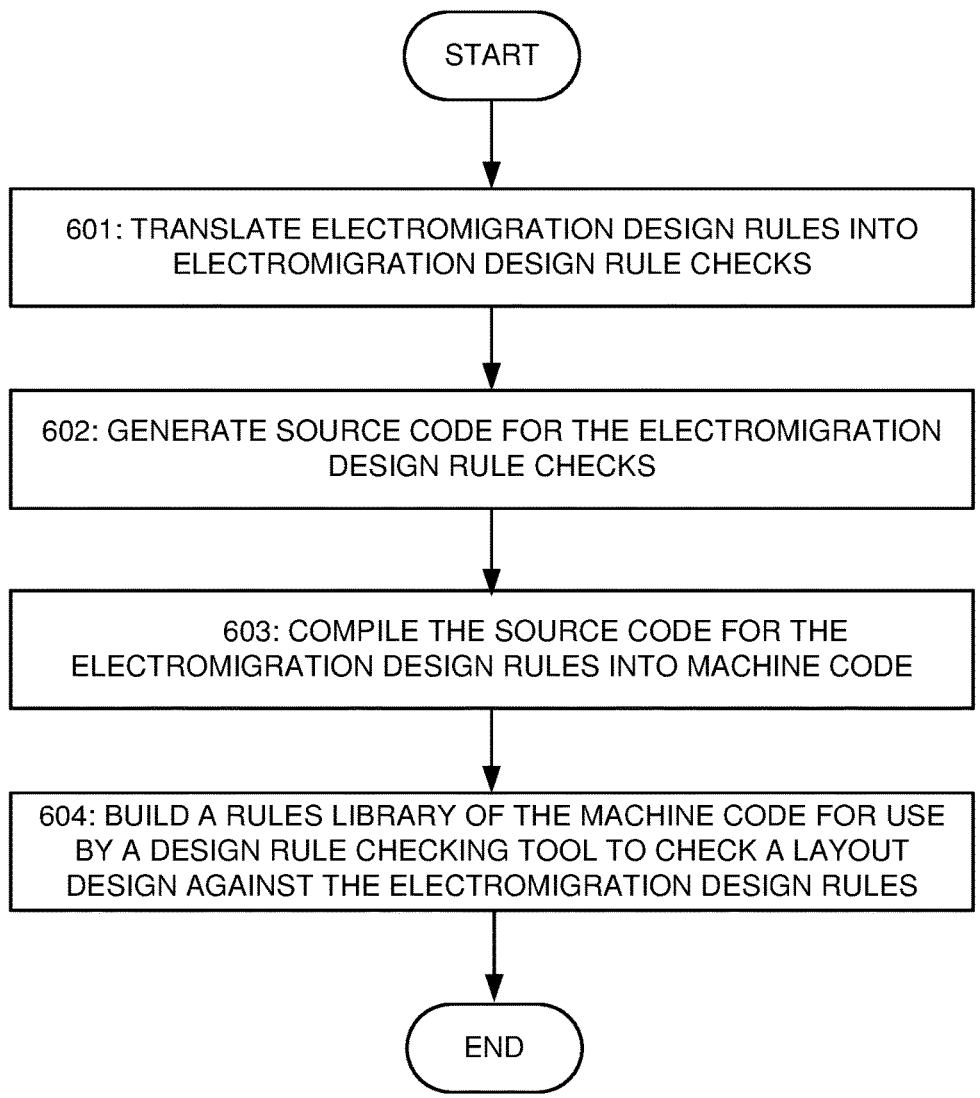
FIG. 6 illustrates an example flowchart for generation of the rules library of machine code that, when executed, implement checks of electromigration design rules according to various embodiments.

FIG. 6 illustrates an example flowchart for generation of the rules library of machine code that, when executed, implement checks of electromigration design rules according to various embodiments. Referring to FIG. 6, in a block 601, a computing system can translate electromigration design rules into electromigration design rule checks. The computing system can parse the electromigration design rules to identify limitations on physical and electrical characteristics of structures in an integrated circuit. The limitations on physical characteristics of the structures can include limitations on width, length, or combination thereof of the structures. The limitations on electrical characteristics of the structures can include limitations on current or current densities in the structures as well as a description on how compute the current or current densities from the physical characteristics of the structures. The computing system can utilize the identified structure limitations to generate at least one conditional statement, expression statement, or like. In some embodiments, the electromigration design rule checks can be in an intermediate format having macro instructions and associated parameters based on the parsed structure limitation.

In a block 602, the computing system can generate source code for the electromigration design rule checks. The computing system can convert the electromigration design rule checks from the intermediate format into source code, for example, written in a compilable computer language, such as C++ or the like. In some embodiments, the computing system can convert the intermediate format by expanding the macro instructions based on a header file identifying the macro instructions and corresponding expansion into lines of source code.

In a block 603, the computing system can compile the source code for the electromigration design rule checks into machine code, and in a block 604, the computing system can build a rules library of the machine code for use by a design rule checking tool to check a layout design of an integrated circuit against the electromigration design rules. In some embodiments, the computing system can implement a just-in-time compiler to generate the rules library of machine code at runtime of another computer program being executed by the computing system, for example, allowing execution of the machine code in the rules library to extend the computer program executed by the computing system.

The processing device may execute instructions or "code" stored in memory. The memory may store data as well. The processing device may include, but may not be limited to, an analog processor, a digital processor, a microprocessor, a multi-core processor, a processor array, a network processor, or the like. The processing device may be part of an integrated control system or system manager, or may be provided as a portable electronic device configured to interface with a networked system either locally or remotely via wireless transmission.

The processor memory may be integrated together with the processing device, for example RAM or FLASH memory disposed within an integrated circuit microprocessor or the like. In other examples, the memory may comprise an independent device, such as an external disk drive, a storage array, a portable FLASH key fob, or the like. The memory and processing device may be operatively coupled together, or in communication with each other, for example by an I/O port, a network connection, or the like, and the processing device may read a file stored on the memory. Associated memory may be "read only" by design (ROM) by virtue of permission settings, or not. Other examples of memory may include, but may not be limited to, WORM, EPROM, EEPROM, FLASH, or the like, which may be implemented in solid state semiconductor devices. Other memories may comprise moving parts, such as a known rotating disk drive. All such memories may be "machine-readable" and may be readable by a processing device.

Operating instructions or commands may be implemented or embodied in tangible forms of stored computer software (also known as "computer program" or "code"). Programs, or code, may be stored in a digital memory and may be read by the processing device. "Computer-readable storage medium" (or alternatively, "machine-readable storage medium") may include all of the foregoing types of memory, as well as new technologies of the future, as long as the memory may be capable of storing digital information in the nature of a computer program or other data, at least temporarily, and as long at the stored information may be "read" by an appropriate processing device. The term "computer-readable" may not be limited to the historical usage of "computer" to imply a complete mainframe, mini-computer, desktop or even laptop computer. Rather, "computer-readable" may comprise storage medium that may be readable by a processor, a processing device, or any computing system. Such media may be any available media that may be locally and/or remotely accessible by a computer or a processor, and may include volatile and non-volatile media, and removable and non-removable media, or any combination thereof.

A program stored in a computer-readable storage medium may comprise a computer program product. For example, a storage medium may be used as a convenient means to store or transport a computer program. For the sake of convenience, the operations may be described as various interconnected or coupled functional blocks or diagrams. However, there may be cases where these functional blocks or diagrams may be equivalently aggregated into a single logic device, program or operation with unclear boundaries.

CONCLUSION

While the application describes specific examples of carrying out embodiments of the invention, those skilled in the art will appreciate that there are numerous variations and permutations of the above described systems and techniques that fall within the spirit and scope of the invention as set forth in the appended claims. For example, while specific terminology has been employed above to refer to electronic design automation processes, it should be appreciated that various examples of the invention may be implemented using any desired combination of electronic design automation processes.

One of skill in the art will also recognize that the concepts taught herein can be tailored to a particular application in many other ways. In particular, those skilled in the art will recognize that the illustrated examples are but one of many alternative implementations that will become apparent upon reading this disclosure.

Although the specification may refer to "an", "one", "another", or "some" example(s) in several locations, this does not necessarily mean that each such reference is to the same example(s), or that the feature only applies to a single example.

The invention claimed is:

1. A method comprising:
   receiving, by a computing system, electromigration design rules defining characteristics of integrated circuits configured to cause electromigration;
   generating, by the computing system, a rules library including machine code implementing electromigration design rule checks for the characteristics defined by the electromigration design rules; and
   performing, by the computing system executing a design rule check program, electromigration design rule checks on a layout design of an integrated circuit by identifying a structure defined in the layout design to check against one or more of the electromigration design rules, calling the rules library to compute electromigration limits utilizing input variables set according to characteristics of the identified structure, and executing the machine code implementing the electromigration design rule checks for the structure of the integrated circuit described in the layout design, which utilizes the computed electromigration limits to determine whether the identified structure conforms with the one or more of the electromigration design rules, wherein calling the library extends the design rule check program, at runtime, to perform the electromigration design rule checks on the layout design for the integrated circuit.

2. The method of claim 1, wherein generating the rules library including machine code implementing the electromigration design rule checks further comprises:
   parsing the electromigration design rules to identify the characteristics of integrated circuits configured to cause electromigration;
   generating source code for the electromigration design rule checks based on the characteristics of integrated circuits configured to cause electromigration; and
   compiling the source code for the electromigration design rule checks into machine code for population into the rules library.

3. The method of claim 2, wherein generating the source code for the electromigration design rule checks further comprises:
   translating the electromigration design rules into an intermediate format for the electromigration design rule checks, where the intermediate format describes the electromigration design rule checks with one or more macro instructions; and
   expanding the macro instructions in the intermediate file into the source code for the electromigration design rule checks.

4. The method of claim 3, wherein expanding the macro instructions in the intermediate format into the source code for the electromigration design rule checks is performed based, at least in part, on a header file describing translations between the macro instructions and the source code.

5. The method of claim 1, further comprising generating a report to identify conformance of one or more structures in the layout design for the integrated circuit to the electromigration design rules.

6. A system comprising:
   a memory device configured to store machine-readable instructions; and
   a computing system including one or more processing devices, in response to executing the machine-readable instructions, configured to:
      receive electromigration design rules defining characteristics of integrated circuits configured to cause electromigration;
      generate a rules library including machine code implementing electromigration design rule checks for the characteristics defined by the electromigration design rules; and
      perform electromigration design rule checks on a layout design of an integrated circuit by identifying a structure defined in the layout design to check against one or more of the electromigration design rules, calling the rules library to compute electromigration limits utilizing input variables set according to characteristics of the identified structure, and executing the machine code implementing the electromigration design rule checks for the structure of the integrated circuit described in the layout design, which utilizes the computed electromigration limits to determine whether the identified structure conforms with the one or more of the electromigration design rules, wherein calling the library extends the design rule check program, at runtime, to perform the electromigration design rule checks on the layout design for the integrated circuit.

7. The system of claim 6, wherein the one or more processing devices, in response to executing the machine-readable instructions, are further configured to generate the rules library by:
   parsing the electromigration design rules to identify the characteristics of integrated circuits configured to cause electromigration;
   generating source code for the electromigration design rule checks based on the characteristics of integrated circuits configured to cause electromigration; and compiling the source code for the electromigration design rule checks into machine code for population into the rules library.

8. The system of claim 7, wherein the one or more processing devices, in response to executing the machine-readable instructions, are further configured to generate the source code for the electromigration design rule checks by:
translating the electromigration design rules into an intermediate format for the electromigration design rule checks, where the intermediate format describes the electromigration design rule checks with one or more macro instructions; and
expanding the macro instructions in the intermediate file into the source code for the electromigration design rule checks.

9. The system of claim 8, wherein the one or more processing devices, in response to executing the machine-readable instructions, are further configured to expand the macro instructions in the intermediate format into the source code for the electromigration design rule checks based, at least in part, on a header file describing translations between the macro instructions and the source code.

10. An apparatus comprising at least one computer-readable memory device storing instructions configured to cause one or more processing devices to perform operations comprising:
receiving electromigration design rules defining characteristics of integrated circuits configured to cause electromigration;
generating a rules library including machine code implementing electromigration design rule checks for the characteristics defined by the electromigration design rules; and
performing electromigration design rule checks on a layout design of an integrated circuit by identifying a structure defined in the layout design to check against one or more of the electromigration design rules, calling the rules library to compute electromigration limits utilizing input variables set according to characteristics of the identified structure, and executing the machine code implementing the electromigration design rule checks for the structure of the integrated circuit described in the layout design, which utilizes the computed electromigration limits to determine whether the identified structure conforms with the one or more of the electromigration design rules, wherein calling the library extends the design rule check program, at runtime, to perform the electromigration design rule checks on the layout design for the integrated circuit.

11. The apparatus of claim 10, wherein generating the rules library including machine code implementing the electromigration design rule checks further comprises:
parsing the electromigration design rules to identify the characteristics of integrated circuits configured to cause electromigration;
generating source code for the electromigration design rule checks based on the characteristics of integrated circuits configured to cause electromigration; and
compiling the source code for the electromigration design rule checks into machine code for population into the rules library.

12. The apparatus of claim 11, wherein generating the source code for the electromigration design rule checks further comprises:
translating the electromigration design rules into an intermediate format for the electromigration design rule checks, where the intermediate format describes the electromigration design rule checks with one or more macro instructions; and
expanding the macro instructions in the intermediate file into the source code for the electromigration design rule checks.

13. The apparatus of claim 12, wherein expanding the macro instructions in the intermediate format into the source code for the electromigration design rule checks is performed based, at least in part, on a header file describing translations between the macro instructions and the source code.

14. The apparatus of claim 10, wherein the instructions configured to cause the one or more processing devices to perform operations further comprising generating a report to identify conformance of one or more structures in the layout design for the integrated circuit to the electromigration design rules.

* * * * *